Dec. 20, 1949  G. W. PICKELS, IV  2,491,688
METHOD OF CONNECTING SHEATHS ENCLOSING
ELECTRICAL ELEMENTS
Filed March 30, 1945

INVENTOR

George W. Pickels IV.
BY

ATTORNEY

Patented Dec. 20, 1949

2,491,688

UNITED STATES PATENT OFFICE 2,491,688

METHOD OF CONNECTING SHEATHS ENCLOSING ELECTRICAL ELEMENTS

George W. Pickels, IV, Pittsburgh, Pa., assignor, by mesne assignments, to the United States of America as represented by the United States Atomic Energy Commission Application March 30, 1945, Serial No. 585,767

11 Claims. (Cl. 29—155.5)

My invention relates to the art of brazing or soldering and more particularly to a novel method of connecting a copper sheath of an electrical lead to the stainless steel sheath of an electrical device such as, for example, a temperature detector element.

Those skilled in this art have for some time been confronted with a serious problem in that the flux customarily used in soldering the sheaths enters the same, thus reducing to an unsatisfactory value the insulation resistance of the insulator for the lead and the detector element. While many fluxless solders are known, none of these is effective in soldering stainless steel to a nonferrous metal such as copper, and for this reason a suitable flux having good wetting characteristics of the two dissimilar metals has always been utilized in soldering or brazing the sheaths of the detector element and the electrical lead, respectively, with the unsatisfactory results above described.

According to my invention this problem is solved by soldering a copper sleeve over the stainless steel sheath while preventing, in any convenient manner, the entrance of flux into the open end of said sheath. Then the lead is connected to the detector element and the copper sleeve of the lead is soldered to the sheath, without the use of flux.

Figure 1:
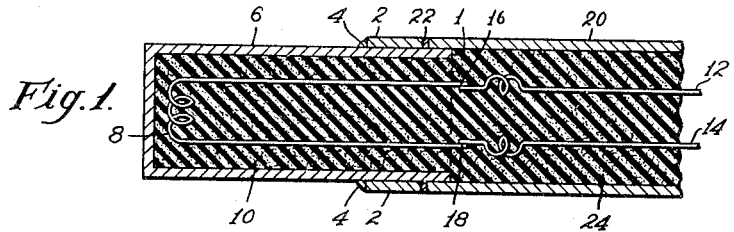
Figure 2:
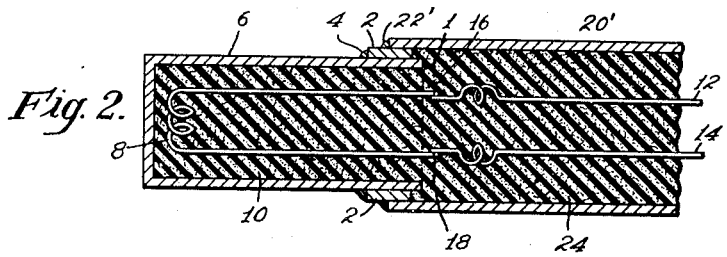
Figure 3:
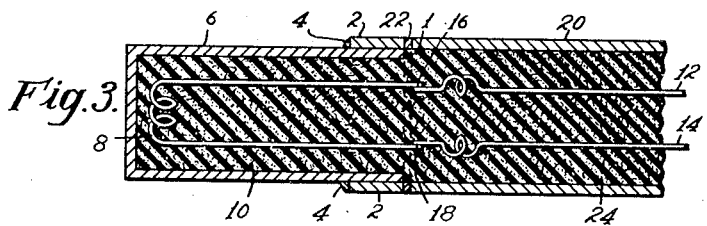
Figure 4:
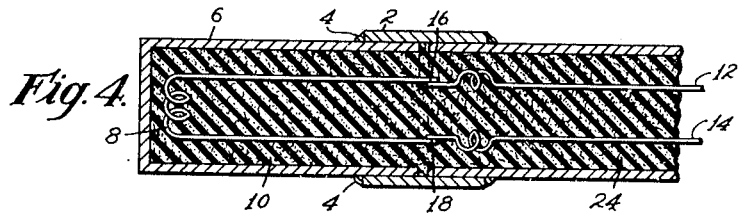

In the drawings, Fig. 1 is a longitudinal sectional view through an electrical device fabricated in accordance with a preferred embodiment of my invention;

Fig. 2 is a longitudinal sectional view through a similar electrical device fabricated in accordance with a second type of preferred embodiment of my invention; and Figs. 3 and 4 are longitudinal sectional views somewhat similar to those shown in Figs. 1 and 2 but illustrating modifications of my invention.

Describing my invention in detail and referring first to Fig. 1, a sleeve 2 of non-ferrous metal such as copper is brazed or soldered at 4 to a stainless steel sheath 6 enclosing an electrical temperature detector element 8 and insulating means 10 therefor. It will be understood by those skilled in the art that the connection at 4 is necessarily made by the use of a flux, and for this reason this connection is made at a point remote from the open end 1 of the sheath 6.

Since the flux has excellent wetting characteristics of stainless steel and copper, the flux readily flows by capillary action from the region 4 toward the right but since sleeve 2 falls considerably short of the end 1 of sheath 6, the flux flow ceases substantially at the region 22. The flux is thus prevented from getting anywhere near the open end 1 of sheath 6.

Then the electrical leads 12 and 14 may be connected in any convenient manner at 16 and 18, respectively, to the element 8. It may be noted that if desired, the connections at 16 and 18 may be made before the sleeve 2 is soldered to the sheath 6. The relatively long or main copper sleeve 20 encasing the leads 12 and 14 is then soldered or brazed as at 22 to the sleeve 2 without the use of flux, thereby avoiding contamination of the insulation 10 for the element 8, as well as the insulation 24 for the leads 12 and 14.

In Fig. 2 the sheath 6 and sleeve 2 are like these elements shown in Fig. 1, but the main sleeve 20' is larger in diameter with reference to sleeve 2 so that the sleeve 20' may be telescoped over the sleeve 2 as shown. The sleeve 20' in this instance is soldered at region 22' to the outer periphery of sleeve 2. Again it will be noted that the flux in this case is prevented from getting near the end 1 of sheath 6. There is thus no contamination of the insulation 10 near the open end of sheath 6.

In the showing in Fig. 3, the open end 1 of sheath 6 and the right end of sleeve 2 fall in the same transverse plane. To obtain the benefits of my invention, the procedure may take two forms. As an additional precaution, the sheath 6 may be covered with wax, non-conducting grease, or other material until the sleeve 2 has been soldered to the sheath, in order to prevent flux from entering the open end of the sheath and thereby contaminating the insulation therein. After the sleeve 2 has been soldered to the sheath 6 with the aid of flux, the wax or other protective coating which may have been contaminated by the flux is removed from the end of the sheath to expose the electric leads 12 and 14 and insulation contained within the sheath. Thus the electric leads 12 and 14 and their insulation are protected from contamination by the soldering flux when the sheath and sleeve are being soldered together. With the temporary protective coating removed, the electric leads 12 and 14 may then be connected in any convenient manner at 16 and 18 respectively to the element 8.

The second procedure may not require such covering. The flux is thus likely to contaminate the insulation 10 at the open end 1, but since the main sleeve 20 is not attached to sleeve 2 until sleeve 2 has been fixed on sheath 6, the open end 1 is readily available and may thus be cleaned of all contaminating flux before sleeve 20 is connected to sleeve 2, by means of fluxless solder, as region 22.

The modification shown in Fig. 4 is self-explanatory. It should be noted though that either of the two procedures discussed in connection with the modification shown in Fig. 3 should be followed in assembling the elements.

The invention in its broader aspects is not limited to the specific method described but departures may be made therefrom within the scope of the accompanying claims without departing from the principles of the invention and without sacrificing its chief advantages.

I claim as my invention:

1. In the fabrication of electrical apparatus comprising an insulated electrical device contained within a stainless steel sheath with an open end, and insulated electric leads contained within a non-ferrous metal sheath, the steps of soldering a non-ferrous metal sleeve to said steel sheath with solder and flux while covering the open end of said steel sheath with a removable protective coating to protect the contents of the sheath from contamination with the flux, then removing said coating and connecting said leads to said device, and thereafter soldering said non-ferrous metal sleeve to said non-ferrous sheath with a fluxless solder.

2. In the fabrication of electrical apparatus comprising an insulated electrical device contained within a stainless steel sheath with an open end, and insulated leads contained within a non-ferrous metal sheath, the steps of positioning a non-ferrous metal sleeve over said steel sheath, soldering said steel sheath to said sleeve at the end thereof remote from said open end, connecting said leads to said device, and then soldering said non-ferrous metal sleeve to said non-ferrous sheath without the use of flux.

3. In the fabrication of electrical apparatus comprising an insulated electrical device contained within a stainless steel sheath having an open end, and insulated electric leads contained within a copper sheath, the steps of soldering a copper sleeve to said steel sheath with solder and flux while covering the open end of said steel sheath to prevent flux from entering the same with a removable protective coating to protect the contents of the sheath from contamination with the flux, then removing said coating and connecting said leads to said device, and thereafter soldering the forward end of said copper sleeve to said copper sheath without the use of flux.

4. In the fabrication of electrical apparatus including a stainless steel sheath having an open end, an electrical device in said sheath, means insulating said device from said sheath, electric leads connected to said device, a non-ferrous metal sleeve encasing said leads, and means insulating said leads from said non-ferrous sleeve; the steps of soldering a non-ferrous metal sleeve over said steel sheath with solder and flux while covering said open end with a removable protective coating to protect the contents of the sheath from contamination with the flux, then removing said coating and connecting said leads to said device, and finally soldering said second mentioned non-ferrous sleeve to said first mentioned non-ferrous sleeve without the use of flux.

5. In the fabrication of electrical apparatus, the steps of soldering a copper sleeve over a stainless steel sheath containing an insulated electrical element while preventing the entrance of flux into said open end by applying a temporary protective coating over said open end, and thereafter soldering the copper sleeve of an insulated electric lead to said first mentioned sleeve without the use of flux.

6. In the fabrication of electrical apparatus, the steps of soldering a non-ferrous metal sleeve over a stainless steel sheath containing an insulated electrical element while preventing the entrance of flux into said open end by applying a temporary protective coating over said open end, then connecting an electrical lead to said element, and finally soldering a non-ferrous metal sleeve encasing said lead to said first mentioned sleeve without the use of flux.

7. A method of connecting the stainless steel sheath of an insulated temperature detecting device to the copper sheath of an insulated electric lead comprising the steps of soldering a copper sleeve over said stainless steel sheath, then soldering said copper sheath to said sleeve with a fluxless solder.

8. In the fabrication of a temperature detector device comprising an insulated element encased by a steel sheath, and an electric lead element encased by a copper sheath, the steps of securing a copper sleeve over said steel sheath and soldering said copper sheath to said copper sleeve without the use of flux.

9. In the fabrication of a device comprising an electrical insulated element encased within a stainless steel sheath and an electrical lead element encased within a non-ferrous metal sheath, the steps of securing a non-ferrous metal sleeve over said steel sheath, and then brazing the sleeve to said second mentioned sheath without the use of flux.

10. In the fabrication of a device comprising an electrical insulated element encased within a stainless steel sheath having an open end, and an electrical lead element encased within a non-ferrous metal sheath having an open end opposed to the first mentioned open end; the steps of securing a non-ferrous metal sleeve over said steel sheath at a point remote from the open end thereof, and then brazing the sleeve to said second mentioned sheath without the use of flux.

11. A method of connecting a first metallic sheath enclosing an insulated electrical element with a second metallic sheath of dissimilar metal enclosing insulated electrical leads comprising the steps of soldering a sleeve over said first sheath with solder and flux while closing the open end thereof with a removable protective coating to protect the contents of the sheath from contamination with the flux, removing said coating, connecting said leads to said element, and then soldering the second sheath to said sleeve without the use of flux.

GEORGE W. PICKELS, IV.

REFERENCES CITED

The following references are of record in the file of this patent:

UNITED STATES PATENTS

| Number | Name | Date |
|---|---|---|
| 2,186,707 | Ray | Jan. 9, 1940 |
| 2,304,489 | Wetzel | Dec. 8, 1942 |
| 2,349,792 | Rosenblad | May 23, 1944 |
| 2,368,391 | Young | Jan. 30, 1945 |